United States Patent [19]

Imsand

[11] Patent Number: 4,647,965
[45] Date of Patent: Mar. 3, 1987

[54] PICTURE PROCESSING SYSTEM FOR THREE DIMENSIONAL MOVIES AND VIDEO SYSTEMS

[76] Inventor: Donald J. Imsand, 4177 Meadow Dr., Marietta, Ga. 30066

[21] Appl. No.: 613,790

[22] Filed: May 24, 1984

Related U.S. Application Data

[63] Continuation-in-part of Ser. No. 547,897, Nov. 2, 1983, Pat. No. 4,567,513.

[51] Int. Cl.$^4$ .............................................. H04N 9/54
[52] U.S. Cl. ...................................... 358/88; 364/522
[58] Field of Search ....................... 358/88, 89, 91, 92, 358/3; 364/522; 382/1

[56] References Cited

U.S. PATENT DOCUMENTS

| | | | |
|---|---|---|---|
| 3,457,364 | 7/1969 | Carrillo | 358/92 X |
| 3,621,214 | 11/1971 | Romney et al. | 364/522 |
| 3,636,551 | 1/1972 | Maguire | 358/88 X |
| 3,674,921 | 7/1972 | Goldsmith | 358/3 |
| 3,682,553 | 8/1972 | Kapany | 358/88 X |
| 3,818,125 | 6/1974 | Butterfield | 358/92 X |
| 3,864,133 | 2/1971 | Hobrough | 358/88 X |
| 3,878,329 | 4/1975 | Brown | 358/88 |
| 3,943,279 | 3/1976 | Austefjord | 358/88 X |
| 4,006,291 | 2/1977 | Imsand | 358/92 |
| 4,399,456 | 8/1983 | Zalm | 358/92 |
| 4,429,321 | 1/1984 | Jones, Jr. et al. | 358/88 |
| 4,489,389 | 12/1984 | Beckwith et al. | 364/522 |
| 4,506,296 | 3/1985 | Marrand et al. | 358/88 |
| 4,525,858 | 6/1985 | Cline et al. | 364/522 X |
| 4,558,359 | 12/1985 | Kuperman et al. | 358/89 |

FOREIGN PATENT DOCUMENTS 0145291 8/1983 Japan ..................................... 358/88

OTHER PUBLICATIONS

"Stereoscopic Television" Abstract, Sziklai; O. G. vol. 636, p. 367, Published 2-4-50.
"A Real Time Stereoscopic Small Computer Graphics Display System" Plott et al., IEEE Transactions, vol. 5, Sep. 1975.
"Mini Computer Control of a Stereo Graphics Display" Willoughby et al., Journal of Applied Crystallography, vol. 7, 1974, pp. 430-434.

Primary Examiner—Howard W. Britton
Assistant Examiner—Victor R. Kostak
Attorney, Agent, or Firm—Kilpatrick & Cody

[57] ABSTRACT

A method and apparatus for improving the quality and viewing comfort of three dimensional movies and other video systems that utilize two stereoscopically related pictures by shifting corresponding object images in one or both of the pictures to positions that more nearly coincide when stereoscopically viewed such that all corresponding stereo object images in the pictures are within a viewer's limit of binocular fusion.

7 Claims, 5 Drawing Figures

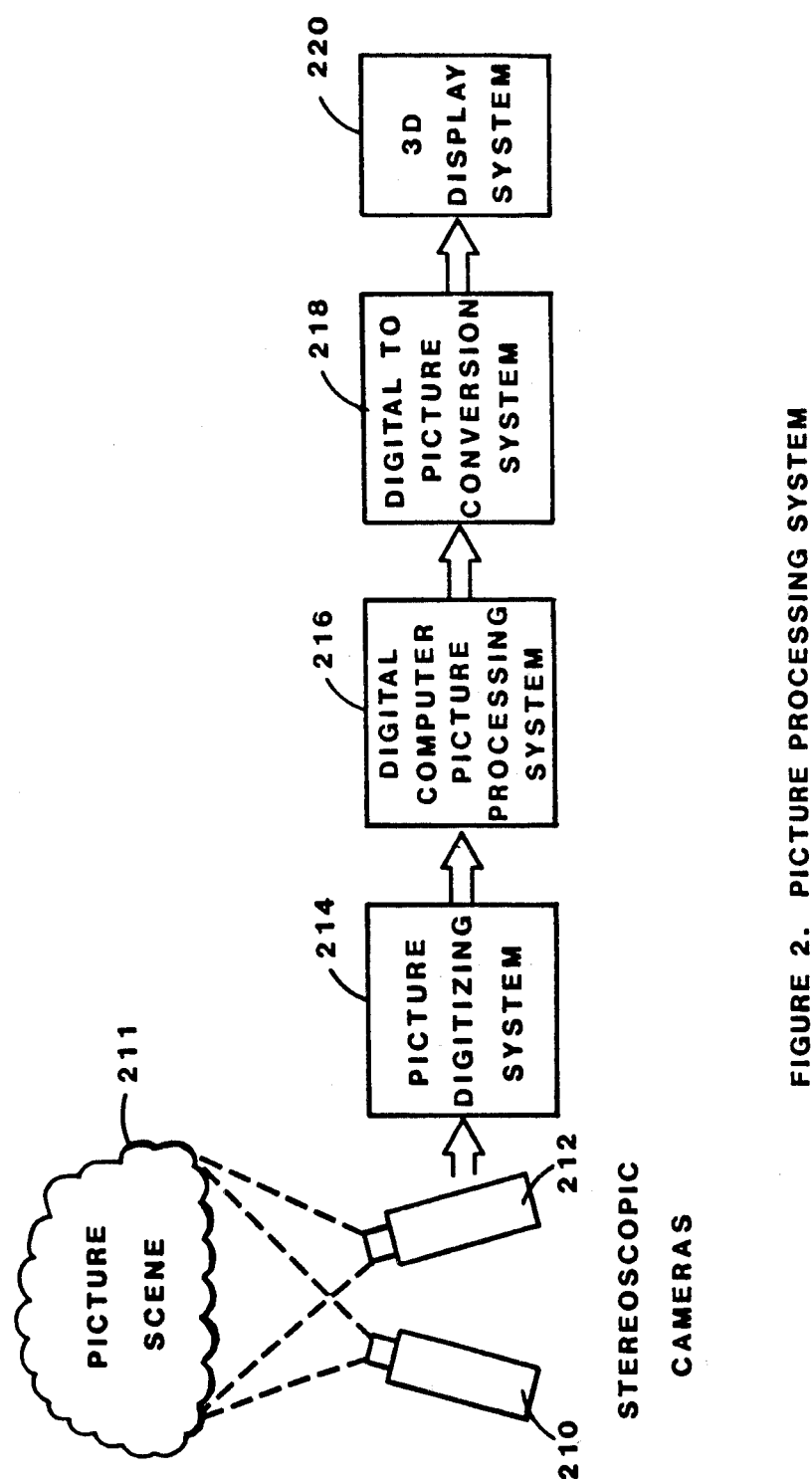
FIGURE 2. PICTURE PROCESSING SYSTEM

PICTURE PROCESSING SYSTEM FOR THREE DIMENSIONAL MOVIES AND VIDEO SYSTEMS

This application is continuation-in-part of my co-pending application Ser. No. 06/547,897, filed Nov. 2, 1983 for a THREE DIMENSIONAL TELEVISION SYSTEM, now U.S. Pat. No. 4,567,513 which application is incorporated herein in its entirety by reference.

BACKGROUND OF THE INVENTION

This invention relates to methods and apparatus for picture or image processing to improve the quality and viewing comfort of three dimensional ("3D") movies and other video systems.

Conventional 3D motion picture systems typically require two movie cameras (or a compound camera), stereoscopically related and synchronized together, to photograph a scene. The two cameras are usually positioned side by side to correspond with a viewer's left and right eyes. When the stereo pictures are reproduced on the viewing screen, usually one is projected with vertically polarized light and the other is projected with horizontally polarized light. The two pictures are projected on the same screen, superimposed on each other. The viewer uses special glasses with polarized filter lenses such that the left lens filters out the right camera picture and the right lens filters out the left camera picture. Thus, the left eye views only the left camera picture and the right eye views only the right camera picture.

The resulting picture usually presents an excellent illusion of three dimensional depth, and adds much realism to the movie. However, despite the positive effects of the 3D illusion, the technique has generally been unsuccessful at the box office. Every ten years or so, a few 3D movies are produced. But each time such movies have proven to be unsatisfactory and uncomfortable to the viewers and have generally proven to be financially unsuccessful.

The reason often cited for the lack of success of 3D movies is that the special glasses are too uncomfortable for the viewer. It may be, however, that the glasses are not prohibitively uncomfortable, but rather, that it is what the viewer sees with the glasses that is uncomfortable and visually tiring for the viewer.

The stereo camera arrangement described above is able to reproduce the conditions required for stereopsis (binocular fusion) to take place. However, such a camera arrangement is not able to adequately reproduce other conditions required for other elements normally involved in the human binocular perception of depth. The elements involved include, in addition to binocular fusion, binocular convergence (and the human convergence control system) and accommodation.

BINOCULAR ELEMENTS OF DEPTH PERCEPTION

In order to better explain the present invention a few elements of depth perception as related to the present invention will now be reviewed. The monocular cues to depth perception are not pertinent to the invention and are not included.

For the purpose of this discussion, an "element" or "picture element" or "pixel" may be defined to be the smallest discernable part of a picture. "Corresponding elements" are elements in two stereo partner pictures that come from the same small part of the same object. "Global convergence" or "globally converged stereo pictures" refers to stereo partner pictures processed such that, when stereoscopically projected (or viewed), all corresponding elements and objects nearly coincide such that all objects, whether foreground or background, are within a viewer's limit of binocular fusion with normal eye convergence angles of the viewer.

Two important cues to the visual perception of depth are the binocular cues of convergence and stereoscopic vision.

CONVERGENCE

When an object is at a great distance, lines of fixation to the object from a viewer's separate eyes are nearly parallel. When the object is near, the viewer's eyes are turned toward the object and the fixation lines converge at a more noticeable angle. If a person fixates his eyes on his finger at arms length and then moves his finger in toward his nose while maintaining the fixation with his eyes, the eyes will "cross". This crossing or "pointing in" of the eyes is detectable by the sensory/control system that controls the position of the eyeballs and produces a sensation of more depth or less depth according to the size of the convergence angle of the eyes. However, visual perception scientists generally agree that convergence is a relatively minor cue to depth perception. A much more important result of convergence is that it also serves to place the two right and left eye images of the object fixated upon at (very nearly) corresponding retinal points in the central retinal area of each eye, thus allowing binocular fusion to take place.

STEREOSCOPIC VISION

When a person looks at an object, the retinal image in the right eye is different (disparate) from the retinal image in the left eye. This disparity is the result of the two eyes viewing the object from the two slightly different positions. Experiments have shown that the human visual perception system is highly sensitive to the disparity of the two retinal images. The visual perception system uses the amount of disparity as a measure of the depth of the object being viewed, with increasing disparity being perceived as the object being closer. No disparity is perceived for a far background object. Studies of visual perception have shown that this stereoscopic vision phenomenon is a much more important cue to depth perception than convergence.

BINOCULAR FUSION

When an object is viewed with two eyes, although the two retinal images may be different, only a single image is normally perceived. This phenomenal process, which takes place in the visual cortex of the sensory system, is known as binocular fusion or stereopsis.

LIMIT OF BINOCULAR FUSION

When the two eyes are converged on an object several feet away, two slightly different images will be viewed by the two eyes but only one binocularly fused image will be perceived. If a second object is immediately beside the first object, it also will be perceived as a binocularly fused image. If the eyes remain fixated (converged) on the first object and the second object is moved further away into the background, a simple geometric projection analysis (see FIGS. 1A and 1B) will show that the difference in retinal correspondence between the two retinal images of the background object will increase. When the difference gets large enough, the sensory system can no longer binocularly fuse the object and a double image will result. When this occurs, the limit of binocular fusion has been reached. This is discussed as "Panum's limiting case" in Chapter 5 of Murch, Gerald M., *Visual and Auditory Perception,* Bobbs-Merrill Company, 1973, which is incorporated herein, by reference, in its entirety.

When the eyes are shifted and fixated on the background object, the background object will again become binocularly fused and the foreground object will become the double image (see FIGS. 1A and 1C).

ACCOMMODATION

The viewer is not normally aware of a double image even though it may be present in most complex scenes. This is because when the eyes are converged on the foreground object they are also focused on that object and the double image of the background object is out of focus and is autonomously de-emphasized via the accommodation property of the visual perception process. Some texts indicate that accommodation is (only) the focusing of the eyes' lenses. However, the deemphasis that may take place in the visual cortex also causes the viewer to be unaware of the out of focus double image.

The interaction of convergence and binocular fusion in binocular depth perception is recognized in visual perception literature as a complex process. E.g., Julez, Bela, *Foundations of Cyclopean Perception,* University of Chicago Press, 1971, which is incorporated herein by reference in its entirety. However, the following simplifications are consistent with visual perception literature and are pertinent to the present invention.

1. The visual perception system controls eye convergence in a manner that tends to maximize the correlation (or retinal correspondence) of the left and right eye images within some central portion of the retina.

2. The resulting two disparate images are processed by the visual cortex to determine (relative) depth by measuring the disparities and to resolve the disparities, merging the two images into a single perceived image.

The visual control system that controls eye convergence is essentially involuntary. That is, a conscious effort is not required to control eye convergence (although we also have a voluntary control "override" capability). The visual cortex seems to perform a correlation measurement process between the left and right central retinal images and moves the eyes such as to maximize this correlation. Normally, a slightly inward convergence angle is required for viewing foreground objects, changing to parallel lines of vision for distant background objects. Diverging angles are not required for normal viewing. In fact, divergence (pointing out) of the eyes is nearly impossible. Slight divergence is possible with significant physical and perhaps psychological stress.

Three dimensional reproduction systems, such as movies, television or any system that tries to reproduce a three dimensional image on a flat screen using stereo cameras, are a paradox. To recreate the same conditions more exactly would imply that the stereo cameras convergence be a priori synchronized with the viewer's eye convergence as he shifts his gaze from foreground to background. Indeed, existing 3D movies have double image problems in many complex scenes.

With a three dimensional reproduction system, it would seem impossible to keep all corresponding elements of a complex scene within a viewer's limit of binocular fusion. As a person shifts his gaze from foreground to background objects in real three dimensional scenes, the convergence angle of his eyes changes thereby changing the relative position of the foreground and background object images on the retina as shown in FIGS. 1B and 1C. Any double images are relieved by the accommodation property of the visual perception system.

However, in 3D movies, the cameras can be converged on only one area at a time (foreground for example) while stereo object images in other areas are unconverged (background for example). FIGS. 1B and 1C can be used to illustrate the results of camera convergence as well as eye convergence. If a foreground object is the intended object of attention, the stereo pictures might be projected as shown in FIG. 1B. When a viewer uses special glasses to view the scenes, the view of the foreground object would be satisfactory. However, when he shifted his gaze to the background object, the autonomous control system that controls eye convergence would tend to force divergence of the eyes in order to cause retinal correspondence of the images. The visual stress of divergence could be avoided by converging (the projection of) the background object images. However, this too, often results in uncomfortable convergence angles of the eyes, especially in scenes involving extremes of background and near foreground objects.

The accommodation property of the visual perception system is ineffective in relieving the visual stress since the eyes are focused on the projection screen and all objects in the scene.

SUMMARY OF THE INVENTION

This invention provides image processing techniques, apparatus and methodology to improve the quality and viewing comfort of stereoscopic picture systems such as 3D motion pictures by eliminating certain visual stresses that are otherwise inherent in stereoscopic picture systems by producing globally converged stereo video.

This invention provides picture processing systems that will process stereo partner pictures such that all corresponding picture elements in a stereoscopically projected image are within a viewer's limit of binocular fusion without unnatural convergence angles, thus allowing stereoscopic viewing without physical and psychological visual stress.

The picture processing techniques involve repositioning object images in one or both of the two stereo pictures so that when the two pictures are superimposed the corresponding picture objects (and corresponding picture elements) nearly coincide, making viewing more comfortable and natural, but the disparities between two corresponding stereo object images, caused by binocular viewing, are preserved thus preserving the depth illusion.

A preferred method for repositioning the corresponding objects described herein is through use of a digital computer. The stereo partner pictures are first digitized. Next the corresponding elements and corresponding object images in the two pictures are identified through digital computer picture processing techniques. Then the corresponding object images may be shifted to corresponding positions. When position shifting of object images causes voids in a picture, the voids may be filled in with video from the corresponding position in the partner picture. When all picture objects have been shifted to nearly corresponding positions, the digitized pictures may be converted back to the appropriate analog form and the resulting pictures projected or viewed in the usual manner such as with polarized glasses.

BRIEF DESCRIPTION OF THE DRAWINGS

FIG. 2 is a functional block diagram of a picture processing system designed to produce globally converged 3D images, pictures or film.

DETAILED DESCRIPTION OF THE DRAWINGS

Figure 1:
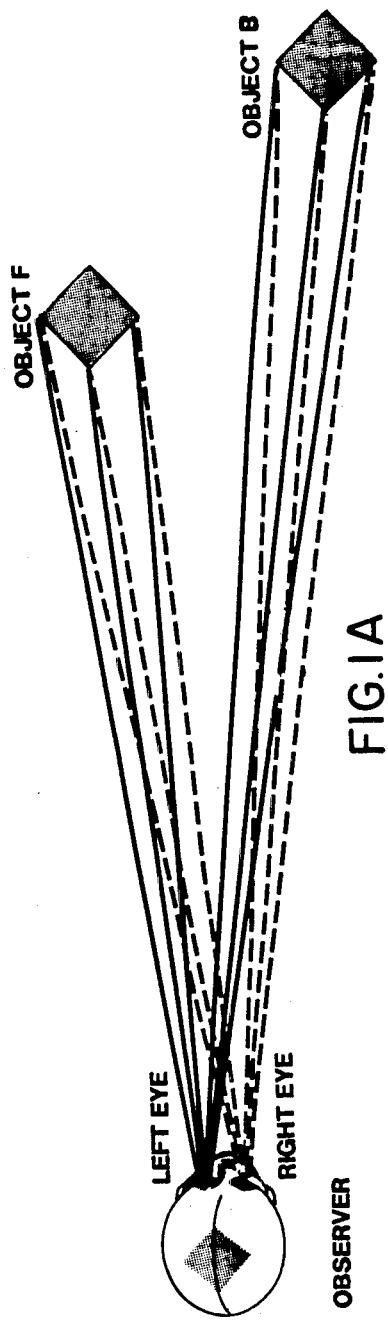
FIGS. 1A-1D are drawings illustrating the geometry of binocular vision.
Figure 1:
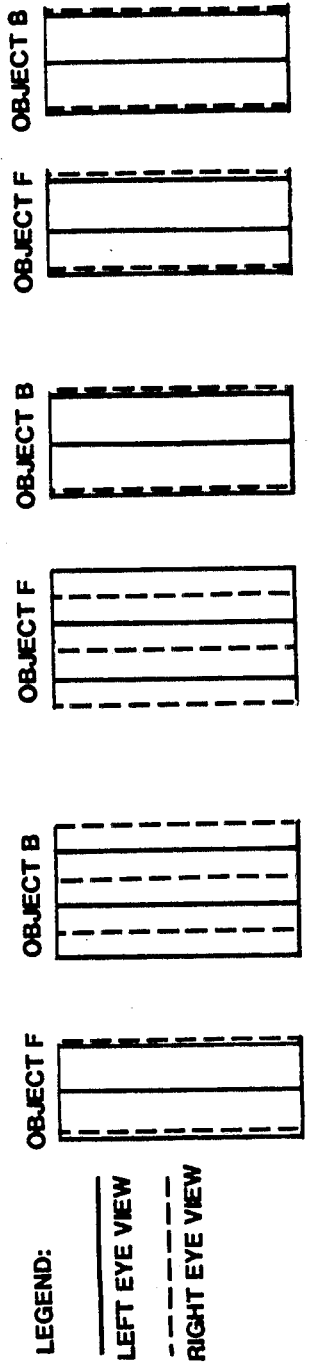

FIG. 1A is a plan view diagram of a human observer and the lines of sight from each eye to a foreground object F and a background object B presented to assist in explaining the present invention.

FIG. 1B is a simplified illustration of the superimposed retinal images for the observer of FIG. 1A when his eyes are converged on the foreground object F.

FIG. 1C is a simplified illustration of the superimposed retinal images for the observer of FIG. 1A when his eyes are converged on the background object B.

FIG. 1D is a simplified illustration of the superimposed retinal images when the video has been processed in accordance with the present invention to simulate simultaneous convergence of the viewer's eyes on both object F and object B, thus allowing binocular fusion of both objects.

Referring to FIG. 2, two motion picture cameras, 210 and 212, with identical optics are correctly spaced and aimed for producing pictures of picture scene 211 which have a stereoscopic relationship to each other. The cameras may be time synchronized together to photograph partner pictures at the same time. The pictures are digitized by a picture digitizing system 214. The picture digitizing system measures the color and intensity of each picture element (pixel) and converts the measured value to digital computer words for input to the digital computer processing system 216. The picture processing system may be a general purpose digital computer such as a Digital Equipment Corporation PDP-11 or VAX-11 series. After the picture information is processed by the picture processing system, 216, it is converted into a picture by the digital to picture conversion system 218 in a format compatible with the stereo viewing system 220.

The above system can be implemented with commercially available equipment such as a COMTAL/3M Vision Ten/24 Image Processing System in a movie loop configuration as picture digitizing system 214, digital computer processing system 216, digital-to-picture conversion system 218 and stereo viewing system 220.

Variations of the above system are also feasible. For example, the cameras, 210 and 212, can be high resolution TV cameras and the picture digitizing system, 214, could be an appropriate video digitizing system as the application requires, such as the COMTAL/3M Vision Ten/24 Image Processing System in a video configuration.

The functions performed by the picture processing digital computer, 216, consist basically of the following functions:

1. Identification of corresponding object images in the stereo partner pictures.

2. Repositioning of object images in one or both pictures such that the positions of corresponding object images correspond adequately for comfortable viewing. This occurs when corresponding object images are within a viewer's limit of binocular fusion with normal eye convergence.

3. When the repositioning of an object image leaves a void in the space from which the object image was moved, then the void may be filled with appropriate background images elements from the partner picture, as the application requires.

The above functions may be performed in the following manner:

1. The recording stereo cameras 210 and 212 are converged on the background area of picture scene 211. Thus, when the recorded pictures are reproduced or projected, corresponding background objects already are superimposed, without repositioning by the picture processing system. For all other objects, (before picture processing) the left camera object image will be positioned to the right with respect to its corresponding right camera object image; the closer the object to the camera, the more the left image is displaced to the right with respect to the corresponding right camera object image.

2. Under computer control, the picture processing system 216 proceeds from left to right and examines and compares each pixel in the two partner pictures. When two pixels in corresponding positions are the same in color (chroma) and intensity (luminosity) the pixels are determined to be from background objects and are not repositioned. When the pixels are not the same, then the right camera pixel is from a foreground object (or some object closer than the background). The right camera pixel is shifted to the right, closer to its corresponding left camera pixel.

3. Since objects normally consist of several pixels, corresponding objects may be identified by groups of matching pixels. This prevents coincidental matching of pixels that are not actually corresponding object elements.

4. When processing is completed, it is not necessary that all corresponding object images be in exactly corresponding positions, only that the images be positioned so that they can be stereoscopically viewed with normal and comfortable convergence angles of the eyes. In fact, if the object images are positioned so that the required eye convergence angles increase as the objects get closer, then relative positions (foreground, midground) of objects may be emphasized in the viewer's perception system. However, the closest object image should still be positioned for stereoscopic viewing with normal and comfortable convergence angles. All corresponding object images should be within the viewer's limit of binocular fusion, when the viewer's eyes are converged on any object image in the scene.

5. Repositioning of an object may cause a void in the position from which it was moved. The void may be filled by corresponding background pixels from the partner pictures.

The resulting processed stereo images may be viewed in the same manner as unprocessed stereo images (for example, with polarized filter glasses). However, the quality and viewing comfort of movies, television and other media presented in accordance with the present invention is significantly improved.

The foregoing description of the present invention is for purposes of explanation and illustration. It will be apparent to those skilled in the relevant art that modifications and changes may be made to the invention as described without departing from the scope and spirit thereof.

I claim:

1. A method for improving the quality and viewing comfort of stereoscopic image projection and viewing systems that utilize two pictures which have at least foreground and midground object images, comprising shifting corresponding object images in the two pictures which images are not within a viewer's limit of binocular fusion to positions that more nearly coincide when stereoscopically viewed such that all corresponding stereo object images in the pictures are within a viewer's limit of binocular fusion.

2. The method in accordance with claim 1 further comprising the step of filling voids caused by shifting of foreground or midground object images in one of the two pictures with appropriate picture elements from the other of the two pictures.

3. A method for improving the quality and viewing comfort of stereoscopic image projection and viewing systems that utilize two pictures which have at least foreground and midground object images, comprising the steps of recordation of analog information about a picture scene having at least foreground and midground objects utilizing two stereoscopically positioned cameras; digitizing such analog information; processing such digitized information by shifting corresponding object images in the two pictures which images are not within a viewer's limit of binocular fusion to positions that nearly coincide when stereoscopically viewed so that all corresponding stereo object images in the pictures are within a viewer's limit of binocular fusion; converting the resulting processed information to analog form; and projecting the processed analog information by means of a stereo viewing system.

4. The method in accordance with claim 3 further comprising the step of utilizing motion picture cameras for said analog information recordation step.

5. The method in accordance with claim 3 further comprising the step of utilizing television cameras for said analog information recordation step.

6. An improved apparatus for providing stereoscopic image projections, comprising:
   a. a pair of stereoscopic cameras positioned to view a scene containing as least foreground and midground objects and to create two pictures of the scene containing object images;
   b. a picture digitizing system for receiving images from the stereoscopic cameras and digitizing such images;
   c. a digital computer picture processing system for receiving the digitized images from the picture digitizing system and processing such digital information by shifting corresponding object images in the two pictures which images are not within a viewer's limit of binocular fusion to positions that more nearly coincide when stereoscopically viewed so that all corresponding stereo object images in the picture are within a viewer's limit of binocular fusion;
   d. a digital to picture conversion system for receiving the processed digital data from the digital computer picture processing system and converting such data to analog image form; and
   e. a stereo viewing system for receiving the analog image data from the digital picture conversion system and providing visible stereo images.

7. The apparatus in accordance with claim 6 wherein said digital computer picture processing system is further utilized for filling picture voids caused by shifting of foreground or midground object images in one of the two pictures with appropriate picture elements from the other of the two pictures.

* * * * *